United States Patent
Spencer et al.

(10) Patent No.: US 7,295,921 B2
(45) Date of Patent: Nov. 13, 2007

(54) PORTABLE VEHICLE NAVIGATION SYSTEM

(75) Inventors: Larry Spencer, Lake Orion, MI (US); Mike Mouser, Ortonville, MI (US); Jeffrey A. Millington, Rochester Hills, MI (US); Roger A. Stevens, Lucas, TX (US); Christopher J. Hook, deceased, late of Detroit, MI (US)

(73) Assignee: Magellan Navigation, Inc., Santa Clara, CA (US)

( * ) Notice: Subject to any disclaimer, the term of this patent is extended or adjusted under 35 U.S.C. 154(b) by 416 days.

(21) Appl. No.: 10/812,027

(22) Filed: Mar. 30, 2004

(65) Prior Publication Data

US 2004/0254722 A1    Dec. 16, 2004

Related U.S. Application Data

(63) Continuation of application No. 09/692,295, filed on Oct. 19, 2000, now abandoned.

(60) Provisional application No. 60/160,274, filed on Oct. 19, 1999.

(51) Int. Cl.
*G01C 21/28* (2006.01)
(52) U.S. Cl. .................................................... 701/208
(58) Field of Classification Search ........ 701/200–201, 701/207–209, 211–217, 220–221, 224; 340/988–993, 340/995–996; 342/457; 307/9.1, 10.1–10.4
See application file for complete search history.

(56) References Cited

U.S. PATENT DOCUMENTS

| | | | |
|---|---|---|---|
| 4,733,356 A | | 3/1988 | Haeussermann et al. |
| 4,942,529 A | * | 7/1990 | Avitan et al. .................. 701/50 |
| 5,760,742 A | | 6/1998 | Branch et al. |
| 5,889,337 A | * | 3/1999 | Ito et al. ..................... 307/10.1 |
| 5,917,435 A | * | 6/1999 | Kamiya et al. ........ 340/995.26 |
| 6,091,956 A | * | 7/2000 | Hollenberg ............... 455/456.5 |

FOREIGN PATENT DOCUMENTS

| | | | |
|---|---|---|---|
| EP | 0816804 | | 1/1998 |
| JP | 7253327 | | 10/1995 |
| JP | 10-213443 | * | 11/1998 |

OTHER PUBLICATIONS

Translation copy of the reference JP10-213443. This translation was provided by the Schreiber translations. Inc. in Feb. 2005.*

* cited by examiner

*Primary Examiner*—Thu V. Nguyen
(74) *Attorney, Agent, or Firm*—John P. Ward; Greenberg Traurig, LLP

(57) ABSTRACT

A navigation system includes an operator interface module (OIM) including a display and keypad. A computer module (computer module) includes a CPU, map database and the motion and position sensors. A docking station is fixedly mounted in each of a plurality of vehicles. The docking station includes an electrical connector connected to the vehicle power supply and an electrical connector connected to a GPS antenna and an electrical connector connected to a display extension harness. The computer module and OIM are transportable among each of the vehicles. The computer module slides into the docking station and simultaneously makes electrical contact with the vehicle power supply, GPS antenna and display extension harness. The OIM is connected to the display extension harness, thereby connecting the OIM to the computer module. The OIM and computer module are thus transportable among multiple vehicles having the appropriate docking station.

10 Claims, 5 Drawing Sheets

PORTABLE VEHICLE NAVIGATION SYSTEM

RELATED APPLICATIONS

The present application is a Continuation of application Ser. No. 09/692,295 filed on Oct. 19, 2000, now abandoned which in turn claims priority to U.S. Provisional Application Ser. No. 60/160,274 filed on Oct. 19, 1999, and priority is hereby claimed under 35 USC § 120 based on these applications.

BACKGROUND OF THE INVENTION

The present invention relates generally to vehicle navigation systems and more particularly to a vehicle navigation system, at least significant components of which are transportable between vehicles. Vehicle navigation systems include many expensive components, including a CPU with mass storage, such as a hard drive, CD or DVD, for storing a map database. Navigation systems further include navigational sensors, such as a GPS receiver, accelerometers, gyros, compass, etc. A navigation system further includes a user interface interacting with the CPU, such as a display, audio speaker, and an input device, such as a keypad or mouse. Installation of the known vehicle navigation systems into the vehicle is difficult and must be performed by an experienced trained technician. Although many households own more than one vehicle, the high cost of many of the vehicle navigation system components make installation of a vehicle navigation system into each of the household vehicles impractical.

SUMMARY OF THE INVENTION

The present invention provides a vehicle navigation system which is easily transportable by a consumer between vehicles. More particularly, at least significant components of the vehicle navigation system are transportable between vehicles. The vehicle navigation system of the present invention includes an operator interface module ("OIM") which includes the user input devices, such as a keypad, and output devices, such as a display and audio speaker. The navigation system further includes a computer module which includes a CPU, mass storage (such as a hard drive), accelerometers and GPS receiver.

In one embodiment of the present invention, the navigation system further includes a docking station with a plurality of electrical connectors. The docking station is fixedly mounted in the vehicle. The computer module is removably mounted in the docking station and is electrically connected via the docking station to the OIM. The vehicle power supply is electrically connected to the computer module via the docking station. A GPS antenna fixedly mounted to the vehicle is also connected to the computer module via the electrical connector on the docking station.

A docking station and GPS antenna are installed in each of at least two vehicles. The vehicle power supply in each vehicle is also connected to the electrical connector of the docking station. The OIM and computer module, which comprise the most expensive components of the vehicle navigation system are transportable between (or among) the vehicles. The computer module is easily slid into a locking position in a docking station, simultaneously making electrical connection with the GPS antenna, vehicle power supply and display extension harness. The OIM is then connected to the docking station. The OIM and computer module can be moved from vehicle to vehicle. Alternatively, a different OIM can be installed in each vehicle, with the computer module being transportable among vehicles.

In this manner, the most expensive components of the vehicle navigation system, contained in the OIM and computer module, need not be purchased for each vehicle. The docking station and GPS antenna, "permanently" installed in each vehicle, are significantly less expensive than the OIM and computer module.

In another embodiment of the present invention, the navigation system is completely "portable," i.e. The entire navigation system is movable between vehicles, without any components being installed in either vehicle.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF A PREFERRED EMBODIMENT

Figure 1:
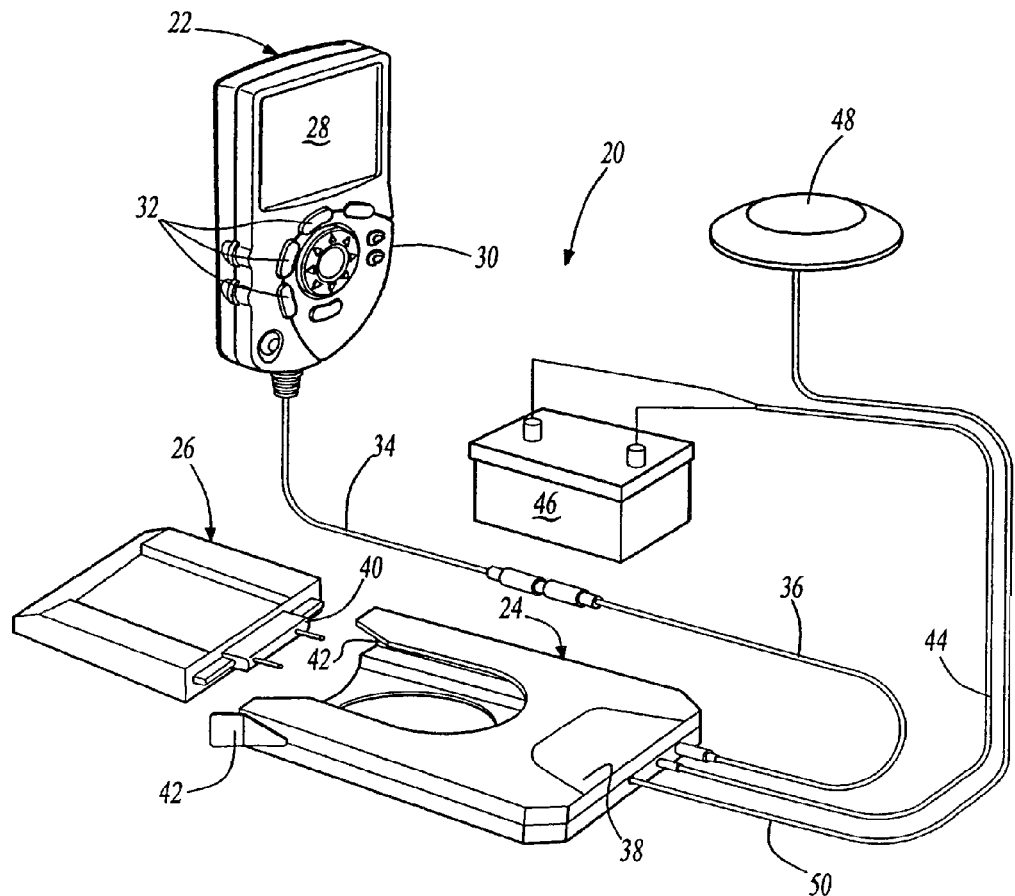
FIG. 1 is a navigation system of the present invention according to a first embodiment.

The present invention provides a vehicle navigation system 20 generally comprising an Operator Interface Module ("OIM") 22, a docking station 24 and a computer module 26. The OIM 22 includes output devices, such as a display 28 and an audio speaker 30 (directed toward the rear of the display 28). The OIM further includes user input devices, such as buttons and a directional keypad, collectively referenced as numeral 32 in FIG. 1. The OIM 22 may alternatively include additional or alternate input devices, such as a keyboard, mouse, microphone, track pad, etc. The OIM 22 is connected electrically with a display harness 34 which is removably electrically connected to a display extension harness 36, which in turn is removably electrically connected to an electrical connector 38 on the docking station 24.

The computer module 26 includes an electrical connector 40 complementary to the electrical connector 38 on the docking station 24. The computer module 26 is removably secured in the docking station 24 and selectively mechanically locked in the docking station 24 via latches 42. When computer module 26 is slid into docking station 24, the connector 40 on the computer module 26 is automatically aligned and mated with the electrical connector 38 on the docking station 24 and the mechanical latches 42 mechanically retain the computer module 26 in the docking station 24.

A vehicle wire harness 44 is wired to the vehicle electrical power supply (shown schematically at 46) and removably secured to the electrical connector 38. A GPS antenna 48 is connected via an antenna harness 50 which is removably secured to the electrical connector 38 in docking station 24.

The GPS antenna 48 includes means for mounting the GPS antenna 48 to the outer surface of a vehicle, such as a magnet, suction cup, clips or fasteners (not shown). When the computer module 26 is docked in the docking station 24, the electrical connectors 38, 40 are mated, thus providing an electrical connection of the computer module 26 to the harnesses 36, 44 and 50 and their corresponding elements, namely the OIM 22, vehicle power supply 46 and GPS antenna 48, respectively. The computer module is selectively, manually removable by a user by unlatching the latches 42 and sliding the computer module 26 out of the docking station 24, at which time the electrical connectors 38, 40 are disconnected.

Figure 2:
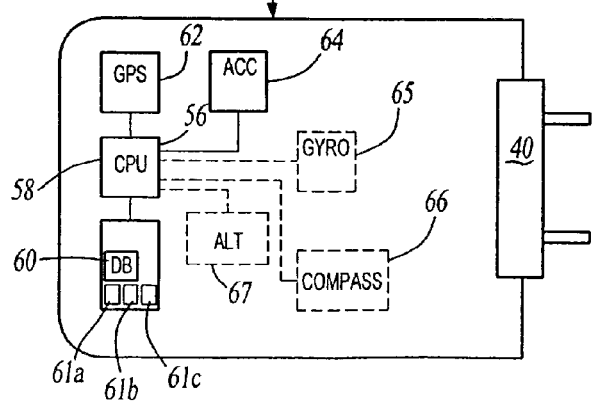
FIG. 2 is a schematic of the computer module of FIG. 1.

The computer module 26 is shown schematically in FIG. 2. The computer module 26 generally includes a CPU 56. The computer module 26 further includes a mass storage 58, such as a hard drive including a database 60 of roads to be traveled by the vehicle navigation system 20 (FIG. 1). Alternatively, the mass storage could comprise a CD ROM, DVD, RAM, magnetic memory, optically readable media or integrated circuit, etc.

The CPU 56 stores data 61a, 61b, 61c relating to each of a plurality of vehicles, preferably in mass storage 58. For example, the date 61a-c for each vehicle includes information based upon which the CPU 56 propagates the position of the computer module 26 relative to the earth or relative to the database 60. For example, the date 61a-c could include information indicating the orientation of the computer module 26 (and thus the multi-axis accelerometer 64) in the associated vehicle. The CPU 56 propagates the position based upon data from the accelerometer 64 and based upon data 61 a-c indicating the orientation of the accelerometer 64 within the associated vehicle.

The orientation information can be user defined or learned when the computer module 26 is first installed into the associated vehicle. For example, when there is very little noise in the signal from the accelerometer 64 and it is determined that the vehicle is not moving, it is easy for the CPU 56 to determine the direction of gravity relative to the orientation of the accelerometer 64 in the vehicle. When the vehicle then accelerates, most of the acceleration is initially in the forward direction, which is then learned by the CPU 56 monitoring the data from the accelerometer 64. The lateral direction is defined as perpendicular to gravity and the forward direction. This technique is described in more detail in co-pending application Ser. No. 09/159,164 filed Sep. 23, 1998 and entitled "Calibration of Orientation of Multi-Axis Accelerometer," which is hereby incorporated by reference.

The computer module 26 also houses a GPS receiver 62 and a multiple axis accelerometer 64, together providing position and motion data to the CPU 56. Other known sensors for use in vehicle navigation systems could also be housed within the computer module 26, such as gyros 65, a compass 66, an altimeter 67, etc. The CPU 56 and GPS receiver 62 are electrically connected (connections not shown) to the electrical connector 40 for connection in turn to the OIM 22, vehicle power supply 46 and GPS antenna 48 (FIG. 1)

Figure 3:
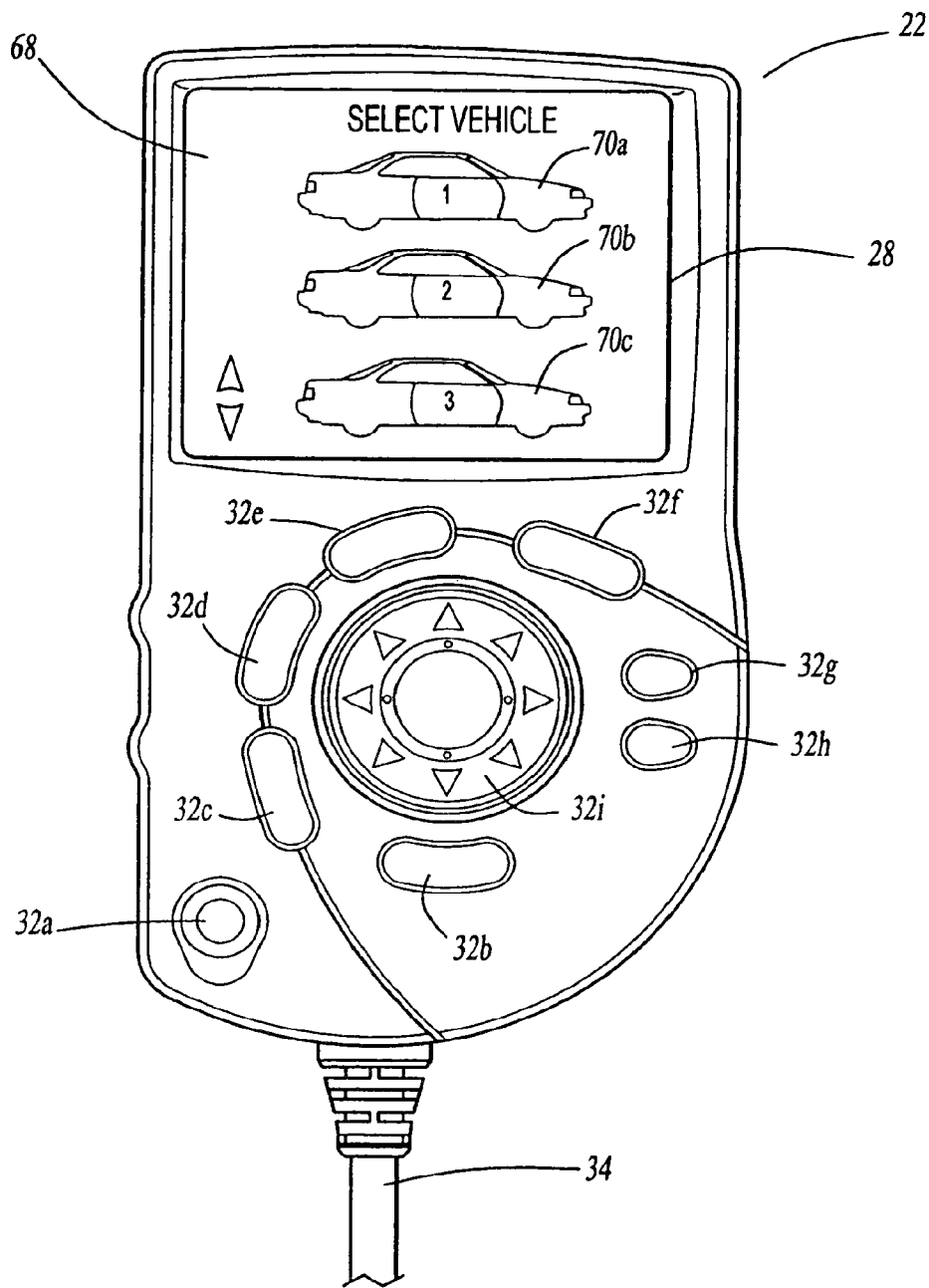
FIG. 3 is an enlarged view of the OIM of FIG. 1.
Figure 4:
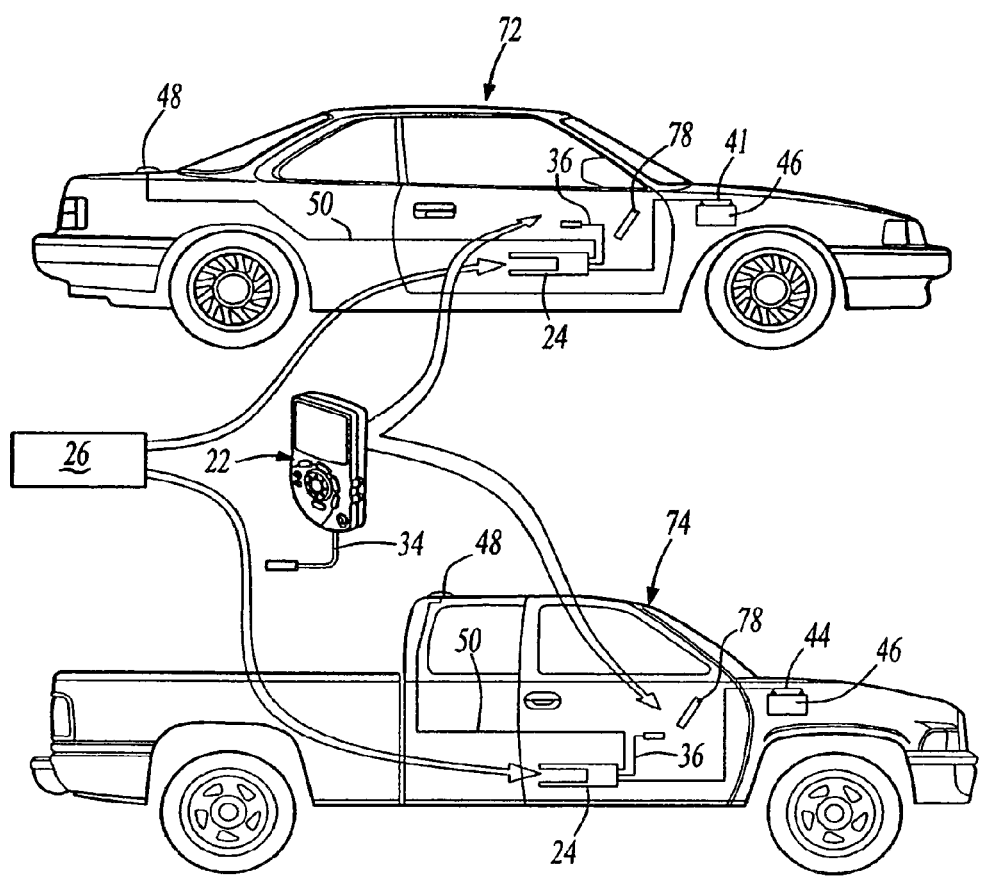
FIG. 4 demonstrates the transportability of the navigation system of FIG. 1.

The OIM 22 is shown in more detail in FIG. 3. In FIG. 3, the OIM 22 is shown displaying a "select vehicle" screen 68 on display 28. The select vehicle screen 68 displays a plurality of vehicle icons 70a, 70b and 70c, each associated with a real vehicle, including vehicles 72, 74 (FIG. 4). Alternatively, icons can be associated with particular users, who are each in turn associated with a vehicle. As can be seen more clearly in FIG. 3, the OIM 22 includes a plurality of input devices 32a-i, including a directional keypad or mouse 32i. Through known software techniques, the directional keypad 32i is utilized to highlight a selected one of the plurality of vehicle icons 70a-c (vehicle icon 70a shown selected). After selecting one of the vehicle icons 70a-c, the user selected the selected icon utilized an "enter" key 32f.

Referring to FIG. 4, the vehicle navigation system 20 is conveniently transportable between two or more vehicles 72, 74 (two vehicles shown). As illustrated in FIG. 4, significant components of the navigation system 20 are transportable between vehicles 72, 74, while the remaining components of the vehicle navigation system 20 are duplicated and installed in each vehicle 72, 74. In the example configuration shown in FIG. 4, the computer module 26 and OIM 22 (with display extension harness 34) are transportable between the two vehicles 72, 74. A docking station 24, GPS antenna 48 and the harnesses 36, 44 and 50 are duplicated and installed on each vehicle 72 and 74. A mount 78 for mounting the OIM 22 is also installed in each vehicle 72, 74. Mount 78 is preferably a hook and snap fit retainer, similar to cell phone mounts in vehicles.

To "install" the OIM 22 and computer module 26 into the first vehicle 72, the computer module 26 is slid into a docking station 24 of the first vehicle 72, where it is automatically mechanically docked into the docking station 24 and automatically electrically connected to the vehicle power supply 46, display harness 36 and GPS antenna 48. The OIM 22 is then connected to the display harness 36 by connecting the display harness 34 to display extension harness 36. The OIM 22 is then mounted on mount 78 in the first vehicle 72. When the navigation system 20 is then turned on, the user, utilizing the OIM 22 and the select vehicle screen 68 shown in FIG. 3 indicates to the computer module 26 which of the two vehicles 72, 74 the computer module 26 and OIM 22 are installed by selecting the icon 70a associated with the first vehicle 72. Based upon the icon 70a selected, the CPU 56 (FIG. 2) then selects the data 61a associated with the first vehicle 72 and propagates the position of the vehicle 72 relative to the earth or relative to the database 60 based upon the information from the accelerometer 64 together with the data 61a and in combination with information from the GPS 62.

The computer module 26 may be selectively removed from the docking station 24 of the first vehicle 72 and easily installed into the docking station 24 of the second vehicle 74. Similarly, the OIM 22 may be removed from the first vehicle 72, connected to the display extension harness 36 in the second vehicle 74 and mounted on mount 78 in the second vehicle 74. Alternatively, the OIM 22 may be duplicated and installed in each vehicle 72, 74. After the computer module 26 is installed into the second vehicle 74, the user, using the select vehicle screen 68 of FIG. 3 selects the icon 70b associated with the second vehicle 74. Alternatively, the CPU 56 may be able to quickly determine the vehicle into which it has been installed based upon its orientation and based upon its relative orientation relative to gravity. The CPU 56 (FIG. 2) then selects the data 61b associated with the second vehicle 74 and propagates the position of the vehicle 74 relative to the earth or relative to the database 60 based upon the information from the accelerometer 64 together with the data 61b and in combination with information from the GPS 62.

As in known navigation systems, the current location of the vehicle 72, 74 is displayed on the display 28 of OIM 22 relative to the surrounding roads. Many techniques for the integration of information from the various position-determining devices are known. Map-matching is also a welldeveloped technique for use in navigation systems. Any of these techniques for determining the position of the vehicle 72, 74 relative to the database 60 of roads can be used, as these techniques form no part of the present invention.

As is known in navigation systems, the user can select a destination relative to the database 60 of roads utilizing the input devices 32 and the display 28. The navigation system 20 then calculates and displays a recommended route directing the driver of the vehicle 72, 74 to the desired destination. Preferably, the navigation system 20 displays turn-by-turn instructions on display 28 along with corresponding audible turn-by-turn instructions via an audio speaker (not shown), guiding the driver to the desired destination.

Utilizing the navigation system 20 of the present invention, significant or expensive components of a vehicle navigation system are easily transportable between at least two vehicles 72, 74. Lower cost components of the vehicle navigation system 20 are duplicated and more permanently installed in each vehicle 72, 74. Thus, a household with at least two vehicles 72, 74 is easily able to transport (and thus avoid duplicating) significant components (such as the computer module 26 and/or OIM 22) between vehicles 72, 74.

Figure 5:
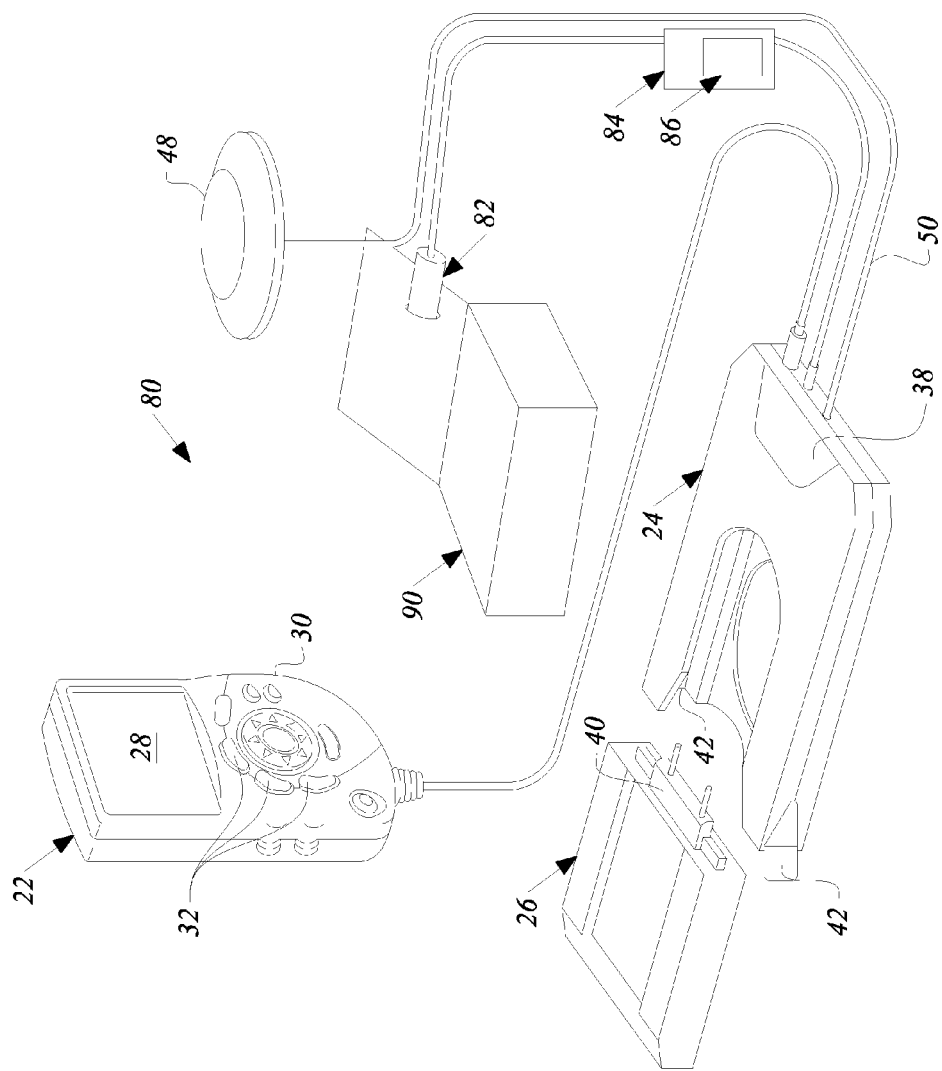
FIG. 5 is a navigation system of the present invention according to a second embodiment.

A completely portable embodiment of the navigation system 80 according to the present invention is shown in FIG. 5. In other words, no components are permanently installed in either vehicle and all of the components are easily moved from one vehicle to the other. Except as noted otherwise below, the navigation system 80 is identical to the embodiment of FIGS. 1-4 and identical components are given identical reference numerals.

Although the computer module 26 is shown removably mounted in the docking station 24, the separate docking station 24 is not necessary in this embodiment. A single, integral housing could be used for the computer module 26 and for supporting the electrical connectors. In this embodiment, the power is provided via a plug 82, such as a cigarette lighter adapter and a power pack 84, preferably including a battery pack 86. Preferably, the GPS antenna 48 includes a magnet mount, so that it can easily be repeatedly secured and removed from an outer surface of a vehicle. Preferably, the navigation system 80 is provided in a carrying case 90, which holds all of the components of the navigation system 80 during transport.

Figure 6:
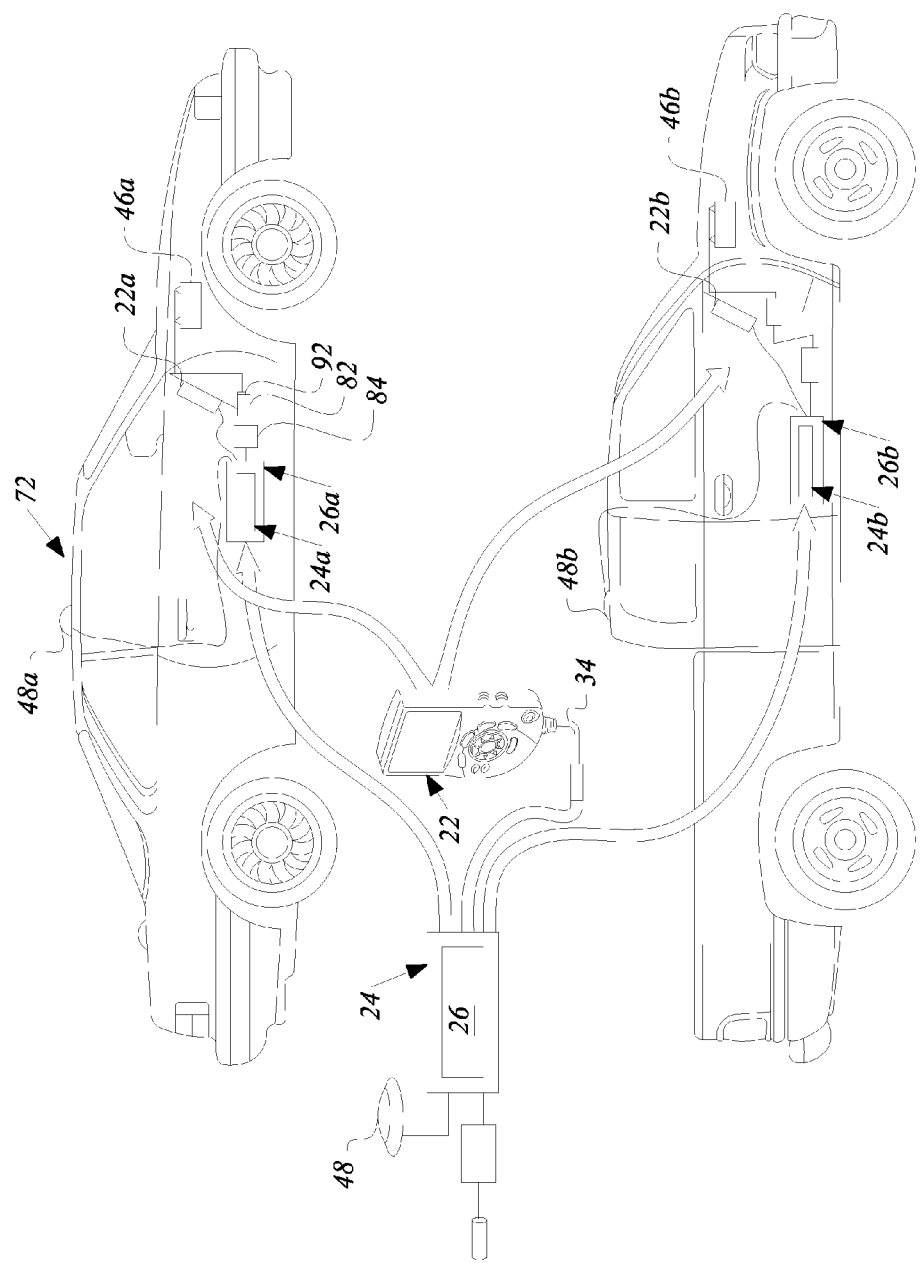
FIG. 6 demonstrates the portability of the navigation system of FIG. 5.

Referring to FIG. 6, the navigation system 80 is easily portable between or among a plurality of vehicles 72, 74. FIG. 6 shows the navigation system 80 used in two different vehicles 72, 74. In vehicle 72, the navigation system 80 components reference numerals have been appended with the letter "a"; in vehicle 74, "b."

Use of the navigation system 80 in vehicle 72 is simple. The user first removes all of the components from the case 90. The user then places the GPS antenna 48 on the roof of the vehicle 72 and routes the antenna wire through the door of the vehicle 72. The display 22 is connected to the computer module 26/docking station 24. The computer module 26/docking station 24 can be placed on the floor of the vehicle 73, preferably on the passenger side. The computer module 26/docking station 24 can but need not be secured to the carpet with Velcro. The display 22 is removably mounted, preferably to one of the vehicle's AC vents. A small bracket or hook on the back of the display 22 achieves this purpose. The plug 82 is then connected to a cigarette lighter socket 92 in the vehicle 72. Since the computer module 26/docking station 24 will be in an unknown orientation, the navigation system 80 is then calibrated in the manner described above with respect to the navigation system 20 of FIG. 1. During use, which is the same as for the navigation system 20 of FIG. 1, the battery pack 86 provides power backup to the navigation system 80 and can power the navigation system 80 temporarily.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A vehicle navigation system comprising:
   a computer module including a CPU, map database, first vehicle data, second vehicle data, and at least one of an inertial sensor and a GPS receiver;
   said computer module utilizing said first vehicle data when the computer module is installed in the first vehicle and said second vehicle data when said computer module is installed in the second vehicle.

2. The vehicle navigation system of claim 1 further including a user interface for providing user input regarding whether to use the first vehicle data or the second vehicle data.

3. The navigation system of claim 2, wherein the user interface includes a display and user operable switches for selecting between the first vehicle data and second vehicle data.

4. The vehicle navigation system of claim 1, wherein the first vehicle data includes information regarding the orientation of the computer module relative to the first vehicle when the computer module is installed in the first vehicle and the second vehicle data includes information regarding the orientation of the computer module relative to the second vehicle when the computer module is installed in the second vehicle.

5. The navigation system of claim 4, wherein the CPU propagates position of the vehicle navigation system based upon the first vehicle data when the computer module is installed in the first vehicle and based upon the second vehicle data when the computer module is installed in the second vehicle.

6. A method for using a vehicle navigation system including the steps of:
   a. removably securing a CPU and inertial sensor in a first vehicle;
   b. removing the CPU and at least one inertial sensor from the first vehicle;
   c. after step b., removably securing the CPU and the at least one inertial sensor in a second vehicle,
   further including the steps of propagating the position of the first vehicle after said step a.
   based upon data from the at least one inertial sensor,
   further including the step of propagating the position of the second vehicle based upon data from the inertial sensor after said step c., further including the steps of:
   storing first vehicle data regarding the orientation of the at least one inertial sensor when installed in the first vehicle; and
   storing second vehicle data regarding the orientation of the at least one inertial sensor when installed in the second vehicle.

7. The method of claim 6 further including the steps of:
   propagating the position of the first vehicle based upon the first vehicle data when the CPU and first inertial sensor are installed in the first vehicle; and
   propagating the position of the second vehicle based upon the second vehicle data when the CPU and at least one inertial sensor are installed in the second vehicle.

8. The method of claim 7 further including the step of manually selecting whether to use the first vehicle data or second vehicle data via a user input device.

9. The method of claim 8, wherein step a. includes the step of mating said CPU and at least one inertial sensor with a docking station mounted in the first vehicle.

10. A method for using the vehicle navigation system including the steps of:
   a) storing first vehicle data regarding operation of the vehicle navigation system when installed in a first vehicle;
   b) storing second vehicle data regarding operation of the vehicle navigation system when installed in a second vehicle;
   c) selectively retrieving either the first vehicle data or the second vehicle data; and
   d) propagating the position of the vehicle navigation system based upon the first vehicle data or second vehicle data selected in said step c).

* * * * *